United States Patent [19]
Moreau

[11] Patent Number: 6,069,954
[45] Date of Patent: May 30, 2000

[54] CRYPTOGRAPHIC DATA INTEGRITY WITH SERIAL BIT PROCESSING AND PSEUDO-RANDOM GENERATORS

[76] Inventor: Thierry Moreau, 9130, Place de Montgolfier, Montreal, Quebec, Canada, H1M 2A1

[21] Appl. No.: 08/853,455

[22] Filed: May 9, 1997

[30] Foreign Application Priority Data

May 29, 1996 [CA] Canada ................................. 2177622

[51] Int. Cl.⁷ .............................. H04K 1/00; H04L 9/00
[52] U.S. Cl. ............................. 380/28; 380/46; 380/268
[58] Field of Search ................................ 380/9, 28, 29, 380/42, 43, 44, 45, 46, 47, 268

[56] References Cited

U.S. PATENT DOCUMENTS

| | | | |
|---|---|---|---|
| 4,447,672 | 5/1984 | Nakamura | 178/22.19 |
| 5,081,676 | 1/1992 | Chou et al. | 380/4 |
| 5,483,598 | 1/1996 | Kaufman et al. | |
| 5,745,571 | 4/1998 | Zuk | 380/21 |

OTHER PUBLICATIONS

Schneier, Bruce, Applied Cryptography 2nd Ed., pp. 381–388, 1996.

Moreau, Thierry, Core Frogbit Algorithm Explanations [internet], http://www.connotech.com/FRGEXPL.HTM, May 1997.

Moreau, Thierry, Message salting with the Frogbit algorithm [internet], http://www.connotech.com/FRGSALT.HTM, May 1997.

Moreau, Thierry, How the Frogbit is used in hash function mode [internet], http://www.connotech.com/FRGBHAEX.HTM, May 1997.

Moreau, Thierry, The Frogbit Hash Function [internet], http//www.connotech.com/FRGBHASH.HTM, Jun. 1996.

Don Coppersmith et al, "The Shrinking Generator", in Advances in Cryptology, Crypto'93, LNCS No. 733, Springer–Verlag, 1994, pp. 22–39.

Hugo Krawczyk, "LFSR–Based Hashing and Authentication", in Advances in Cryptology, Crypto'94, LNCS (Lecture Notes in Computer Science) 839, Springer Verlag, 1994, pp. 129–139.

*Primary Examiner*—Tod R. Swann
*Assistant Examiner*—Stephen Kabakoff
*Attorney, Agent, or Firm*—James Anglehart; Swabey Ogilvy Renault

[57] ABSTRACT

A new structure for a secret key cryptography algorithm uses double exclusive-or (XOR) encryption ($e_i = k1_i$ XOR $m_i$ XOR $k2_1$), analogue to a stream cipher arrangement, but providing data integrity protection. The double XOR encryption creates an inner sequence, for example $s_i = k1_i$ XOR $m_i$ for the encryption process, $s_i = k2_i$ XOR $e_i$ for the decryption process, which is unknown to the adversary and is used as a starting point for feedback on the very key streams used in the encryption of following bits of the message. In its preferred embodiment, this structure is the Frogbit data integrity algorithm which uses 10 independent pseudo-random sources. The Frogbit algorithm is well suited to the design and implementation of "semi-proprietary" ciphers, where the overall design is publicly known and peer-reviewed but a significant amount of the implementation specification is left open to private customization. The Frogbit algorithm is a means to create computer programs and microprocessor-based devices that are harder to crack with reverse engineering than with the prior art.

6 Claims, 3 Drawing Sheets

CRYPTOGRAPHIC DATA INTEGRITY WITH SERIAL BIT PROCESSING AND PSEUDO-RANDOM GENERATORS

FIELD OF THE INVENTION

The present invention relates to cryptographic data integrity apparatuses and methods based on pseudo-random bit generators. It is in the field of secret key cryptography, but it can also provides a secure hash function of the type used for public key digital signatures. The present invention also relates to information security techniques intended to counter the threat of reverse engineering applied to computer algorithms and to data processed during computer program execution.

DESCRIPTION OF THE PRIOR ART

In the rapidly evolving field of secret key cryptography, block ciphers and stream ciphers are well known as distinct classes of algorithms. More classes of algorithms may be needed for to better address the many challenges of securing the many applications of the information technology. Moreover, the secure hash functions currently in widespread use are derivatives of a MD4, and alternate constructions for secure hash functions are needed.

One of the recurrent problem in electronic transaction security is the threat of "bogus terminals," an example of which is a POS terminal with a bank label and the look and feel of a legitimate POS terminal, but actually operated by a defrauder. The transactions are rejected because the bogus terminal is not connected to the financial network, but the defrauder may intercept the account holder PINs before the account holder becomes aware of the rejection, which may be attributed to a technical failure.

With the growing use of personal computer software for electronic transactions, the bogus terminal threat could materialize if someone downloads a bogus software application from a server without being aware of the sham. For instance, a defrauder may change the electronic mail address of the financial institution in the bogus software application. Then, the account holder would prepare a complete financial transaction, including the secret PIN, and the transaction details would be sent to the defrauder's mailbox.

With the further development of a public key infrastructure for electronic transactions, the concern about bogus software applications does not vanish; it turns into a concern about integrity of the public key for the "top-level certification authority". For instance, the look and feel of a bogus software application would not allow the account holder to detect if the top-level public key would have been changed to one chosen by a defrauder. The bogus software application would obtain a false chain of security certificates prepared by the defrauder using the bogus top-level public key. As a consequence, the financial transaction would be sealed and encrypted for the defrauder instead of the financial institution.

For to lessen the threat of bogus terminals, the typical countermeasure is to control the distribution of complete terminals (and parts, materials, and technical data used to make terminals) with the very look and feel that puts an account holder in confidence to enter a secret PIN. The same strategy should be used with software applications: serious software publishers should tightly control the issue of new releases to prevent bogus releases by defrauders. Thus, the critical data for which integrity protection is needed should be embedded in the software application in a way known by as few persons as possible.

Bogus terminals may also be operational terminals modified by a defrauder, either after being stolen, or legally obtained and then diverted from legitimate usage. Thus, it becomes important to increase the difficulty of reverse-engineering. One way to do this with software is to encrypt and seal critical data, so that it is available in clear form only within the computer memory and when in use. But then the cryptographic keys used for encryption and sealing becomes the critical data, so the reverse engineering threat is set back rather than eliminated. Then, it may look sound to use a proprietary algorithm to do the encryption and sealing, with a proprietary cryptographic key structure. The problem with proprietary cryptographic algorithms is that their design lack the critical review of expert cryptanalysts.

The desired security is to ascertain that a set of data (e.g. the contents of a configuration file) is unmodified and used only by a software program released by a given organization. The use of a proprietary cryptographic algorithm against bogus software is a simple and obvious approach. Little prior art references can be cited because something proprietary is undisclosed by definition, and because those who publish cryptographic algorithms usually distrust those who recommend the use of unpublished algorithms. With the proprietary approach, the security is based on 1) the difficulty of reverse-engineering a proprietary algorithm with a proprietary cryptographic key format, 2) the obscure embedding of such cryptographic key in the executable portion of a software application, 3) the difficulty of reading and/or changing critical application data if it is available in clear form only within the computer memory and when in use, and 4) the reasonableness of using a given "recipe" as a basis for making a proprietary cryptographic algorithm.

In the book by Bruce Schneier (*Applied Cryptography*, John Wiley & Sons, 1996), the very first lesson introduced, on page 3, is that "Restricted algorithms have historical interest, but are woefully inadequate by today's standard." But a strong public algorithm like triple-DES with an application-wide secret key stored in the executable version of a software application is at best equivalent to a restricted algorithm! Moreover, the said book by Bruce Schneier contains a very comprehensive survey of variants, combinations, and rearrangements of published algorithms. Many sections of this survey may serve as a starting point for the obvious process of 1) designing a proprietary cryptographic scheme, 2) writing and debugging the corresponding source code with a unique representation for the secret key, 3) compiling the source code into object code modules, and 4) linking into executable module format including the final secret key value to be used by the application. It would be useful to reduce the level of skills required for the design of proprietary cryptographic schemes, while increasing the quantity of details left open for proprietary customization. There is an abundant prior art for the design of unique pseudo-random number generators. But there is no prior art "recipe" to turn one or more pseudo-random number generator into a data integrity algorithm.

SUMMARY OF THE INVENTION

The present invention uses a very different arrangement than the prior art for the construction of cryptographic data integrity algorithms. A cryptographic data integrity algorithm is 1) a first method to transform a binary message into a binary representation, coupled with 2) a second method to process a binary string where said second method produces a signal indicating, with an overwhelming probability, whether the said binary string is a binary representation produced according to the first method.

While the usual cryptographic data integrity algorithms are block algorithms, the present invention is a kind of stream cipher modified to provide data integrity protection. Due to the novel arrangement of the present invention, the key stream applicable to a given bit is influenced by the preceding message bits. Indeed, the present invention may use ten independent pseudo-random number generators (a stream cipher uses only one), in which case the variance in the key stream is implemented by changes in the designation of the key stream to use for a given bit in the message. The independent pseudo-random generators can be taken from the prior art.

The core algorithm of the present invention, called the "Frogbit" algorithm, can be used in different modes, just like a block encryption algorithm can be used on ECB or CBC mode of operation, or with the CBC-MAC arrangement for a secret key data integrity algorithm. The core Frogbit algorithm can be used in a wide range of modes of operation.

BRIEF DESCRIPTION OF THE DRAWINGS

The present invention will be better understood by way of the following detailed description of the invention with reference to the appended drawings, in which.

DETAILED DESCRIPTION OF THE INVENTION

Figure 1:
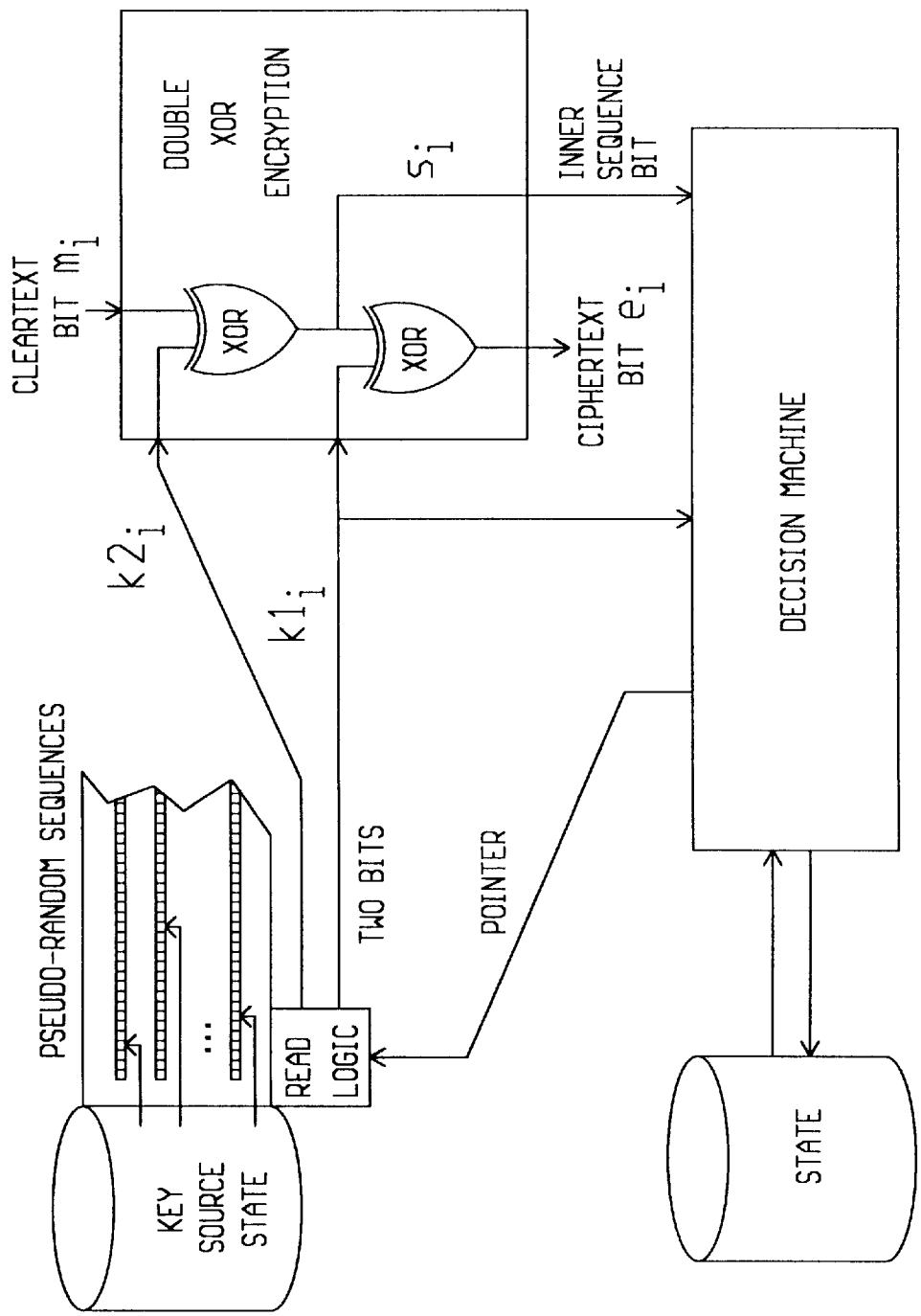
FIG. 1) is an overview block diagram illustrating the arrangement specific to the core Frogbit data integrity algorithm.

The primary formulation of the "core Frogbit algorithm" uses mathematical notation. As in a conventional stream cipher arrangement, the cleartext bits are $m_i$ and the ciphertext bits are $e_i$, where i is the rank of an individual bit within the message. With the core Frogbit algorithm, the encryption equation is $e_i = k1_i$ XOR $m_i$ XOR $k2_i$ and the decryption equation is $m_i = k2_i$ XOR $e_i$ XOR $k1_i$, where XOR is the boolean exclusive or operator and $k1_i$ and $k2_i$ are bits to be defined hereafter. In every iteration of the core Frogbit algorithm, an inner sequence bit $s_i$ is defined with the following unconditional iteration equation: $s_i = k1_i$ XOR $m_i = k2_i$ XOR $e_i$.

The core Frogbit algorithm has a design parameter n, from which $N = 3 \cdot 2^n - 2$. Preferably n=2, hence N=10. Each iteration of the algorithm is defined as a series of functions that use elements of the state information indicated in the table below. There is an unconditional iteration equations, defined as $r'(i) = r(i) \mod n$, and a few conditional iteration equations as indicated in the table below. The functions $r(i)$, $r'(i)$, $d(i)$, $i'(i)$, $d'(i)$ are integer functions. The function $T(i)$ is a function giving a vector of N integers, where $T(i)[q]$ refers to the q+1'th element of the vector $T(i)$. In the definition of the function $T(i)$, the letter P refers to a matrix of integers, notation $P[j,q]$ with row indice $j < 2N$ and column indice $q < N$.

|  | Condition | r(i) = | Condition | d(i) = | i'(i) = | T(i) = | d'(i) = |
|---|---|---|---|---|---|---|---|
| Iteration equations | $s_i \neq s_{i-1}$ | 0 | $r'(i-1) = 0$ | $k2_i$ | $i - 1$ | $\{T(i'(i))[P[j,0]],$ | $T(i'(i))[d(i)]$ |
|  |  |  | $r'(i-1) = 1$ | $2 + 2K2_{i-1} + k2_i$ | $i - 2$ | $T(i'(i))[P[j,1]],$ |  |
|  |  |  | $r'(i-1) = 2$ | $6 + 4k2_{i-2} + 2K2_{i-1} + k2_i$ | $i - 3$ | $\ldots,$ |  |
|  |  |  | $\ldots$ | $\ldots$ | $\ldots$ | $T(i'(i))[P[j,N-1]]$ |  |
|  |  |  | $r'(i-1) =$ | $2^n - 2 + 2^{n-1}k2_{i-n+1} + \ldots + k2_i$ | $i - n$ | $\}$ |  |
|  | $s_i = s_{i-1}$ | $r(i-1) + 1$ | $n - 1 \; r'(i) = 0$ | $2^{n+1} - 2 + 2^{n-1}k2_{i-n+1} + \ldots + k2_i$ | $i - n$ | where |  |
|  |  |  | $r'(i) \neq 0$ | undefined | $i - 1 - r'(i-1)$ | $j = 2d'(i-1) + s_{i-1}$ |  |
|  |  |  |  |  |  | undefined | $d'(i-1)$ |
| State information | $s_{i-1}$ |  | $r'(i-1)$, | $K2_{i-r'(i-1)}K2_{i-r'(i-1)+1} \ldots K2_{i-1}$ |  | $T(i'(i))$, | $d'(i-1)$, |
|  |  |  | $0 \leq r'(i-1)$ | (empty if $r'(i-1) = 0$) |  | $0 \leq T(i'(i))[q] < N$ | $0 \leq d'(i-1) < N$ |

The matrix P is a fixed table of 2N permutations of N elements, that is $0 <= P[j,q] < N$, and $P[j,q'] <> P[j,q'']$ for $q' = q''$. A reference matrix P is given for n=2 in the table below, but the present invention may be practiced with other matrices P.

| j | P[j, 0] | P[j, 1] | P[j, 2] | P[j, 3] | P[j, 4] | P[j, 5] | P[j, 6] | P[j, 7] | P[j, 8] | P[j, 9] |
|---|---|---|---|---|---|---|---|---|---|---|
| 0 | 5 | 8 | 7 | 9 | 3 | 2 | 4 | 0 | 6 | 1 |
| 1 | 2 | 3 | 7 | 6 | 8 | 1 | 9 | 0 | 5 | 4 |
| 2 | 6 | 0 | 4 | 2 | 3 | 7 | 8 | 1 | 9 | 5 |
| 3 | 6 | 5 | 8 | 4 | 2 | 3 | 0 | 9 | 7 | 1 |
| 4 | 3 | 2 | 0 | 6 | 8 | 1 | 5 | 9 | 7 | 4 |
| 5 | 6 | 2 | 9 | 1 | 5 | 8 | 7 | 3 | 4 | 0 |
| 6 | 4 | 8 | 9 | 7 | 3 | 0 | 1 | 6 | 5 | 2 |
| 7 | 5 | 9 | 3 | 7 | 0 | 4 | 2 | 1 | 6 | 8 |
| 8 | 8 | 0 | 1 | 2 | 6 | 3 | 7 | 4 | 9 | 5 |
| 9 | 9 | 4 | 6 | 5 | 2 | 3 | 0 | 8 | 1 | 7 |
| 10 | 7 | 6 | 4 | 8 | 1 | 9 | 5 | 2 | 3 | 0 |
| 11 | 1 | 4 | 8 | 0 | 7 | 2 | 9 | 5 | 3 | 6 |
| 12 | 7 | 4 | 5 | 0 | 9 | 8 | 3 | 6 | 1 | 2 |

-continued

| j | P[j, 0] | P[j, 1] | P[j, 2] | P[j, 3] | P[j, 4] | P[j, 5] | P[j, 6] | P[j, 7] | P[j, 8] | P[j, 9] |
|---|---------|---------|---------|---------|---------|---------|---------|---------|---------|---------|
| 13 | 3 | 9 | 0 | 5 | 6 | 2 | 8 | 4 | 1 | 7 |
| 14 | 8 | 9 | 1 | 0 | 2 | 7 | 5 | 6 | 4 | 3 |
| 15 | 9 | 5 | 4 | 1 | 7 | 0 | 3 | 8 | 2 | 6 |
| 16 | 7 | 3 | 6 | 9 | 5 | 4 | 1 | 2 | 0 | 8 |
| 17 | 4 | 7 | 9 | 5 | 1 | 6 | 2 | 8 | 0 | 3 |
| 18 | 2 | 7 | 3 | 8 | 9 | 6 | 4 | 5 | 0 | 1 |
| 19 | 1 | 6 | 5 | 4 | 0 | 9 | 7 | 3 | 2 | 8 |

The Frogbit uses N independent pseudo-random sources. The bit <$k1_{i+1}, k2_{i+1}$> is given by d'(i)+1'th source. The state information for pseudo-random sources is part of the global Frogbit state information.

This specification is sufficient for a computer programmer to program the "rigid part of the Frogbit specification", that is the part of the cryptographic method that should benefit from public disclosure and peer review. This task is simplified with the preferred embodiment because the parameter n is set to 2. The end result of this programming exercise can be something like program listing "A", which is a second formulation of the core Frogbit algorithm.

Using known optimization techniques for the subprograms encipher_bit and decipher_bit of program listing "A", it is possible to replace many operations and jumps with a single table-lookup operation. This gives the program listing "B", which is a third formulation of the core Frogbit algorithm.

Figure 2:
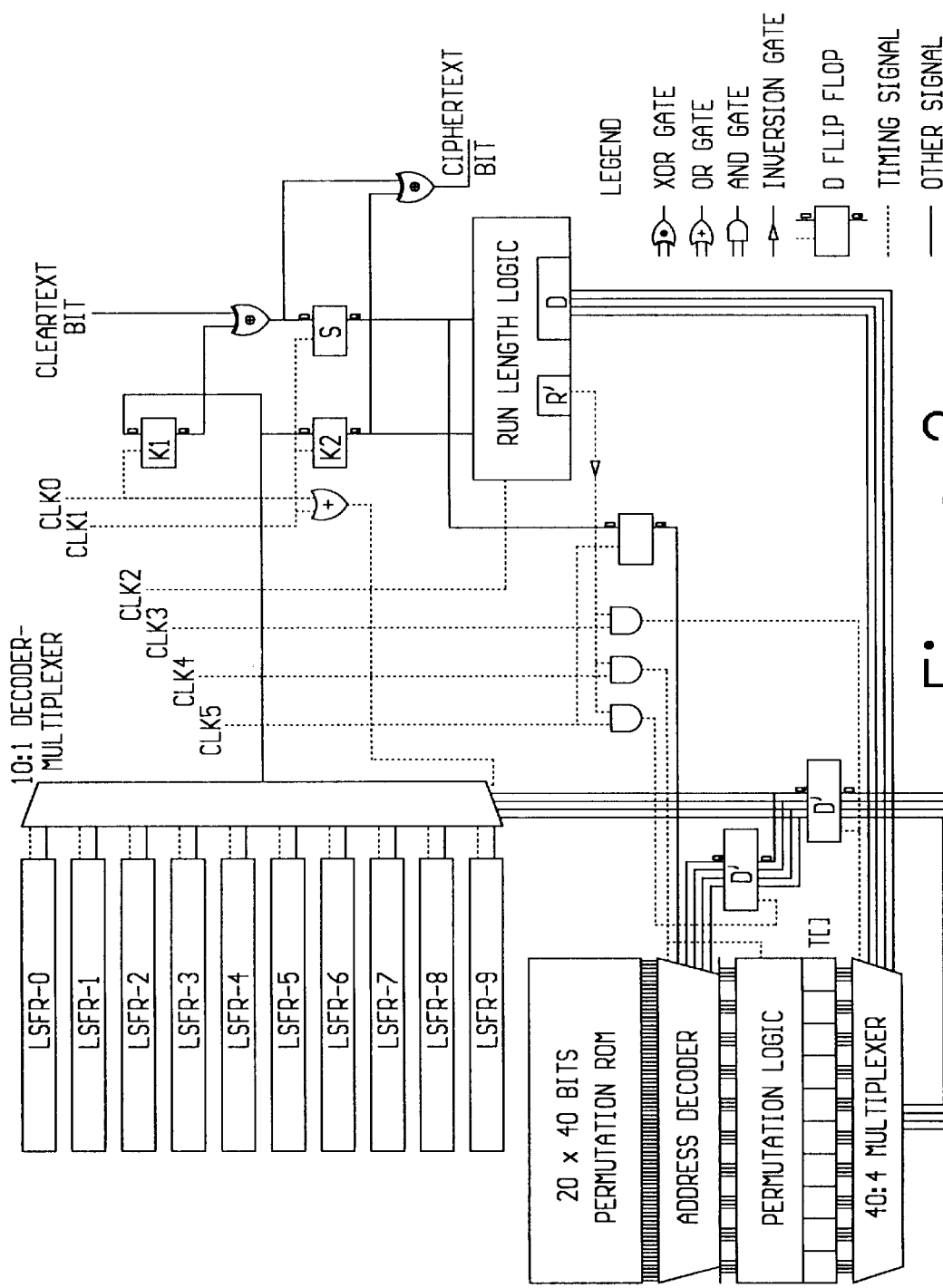
FIG. 2) is a block diagram illustrating a possible hardware implementation of the core Frogbit data integrity algorithm in its encryption mode.
Figure 3:
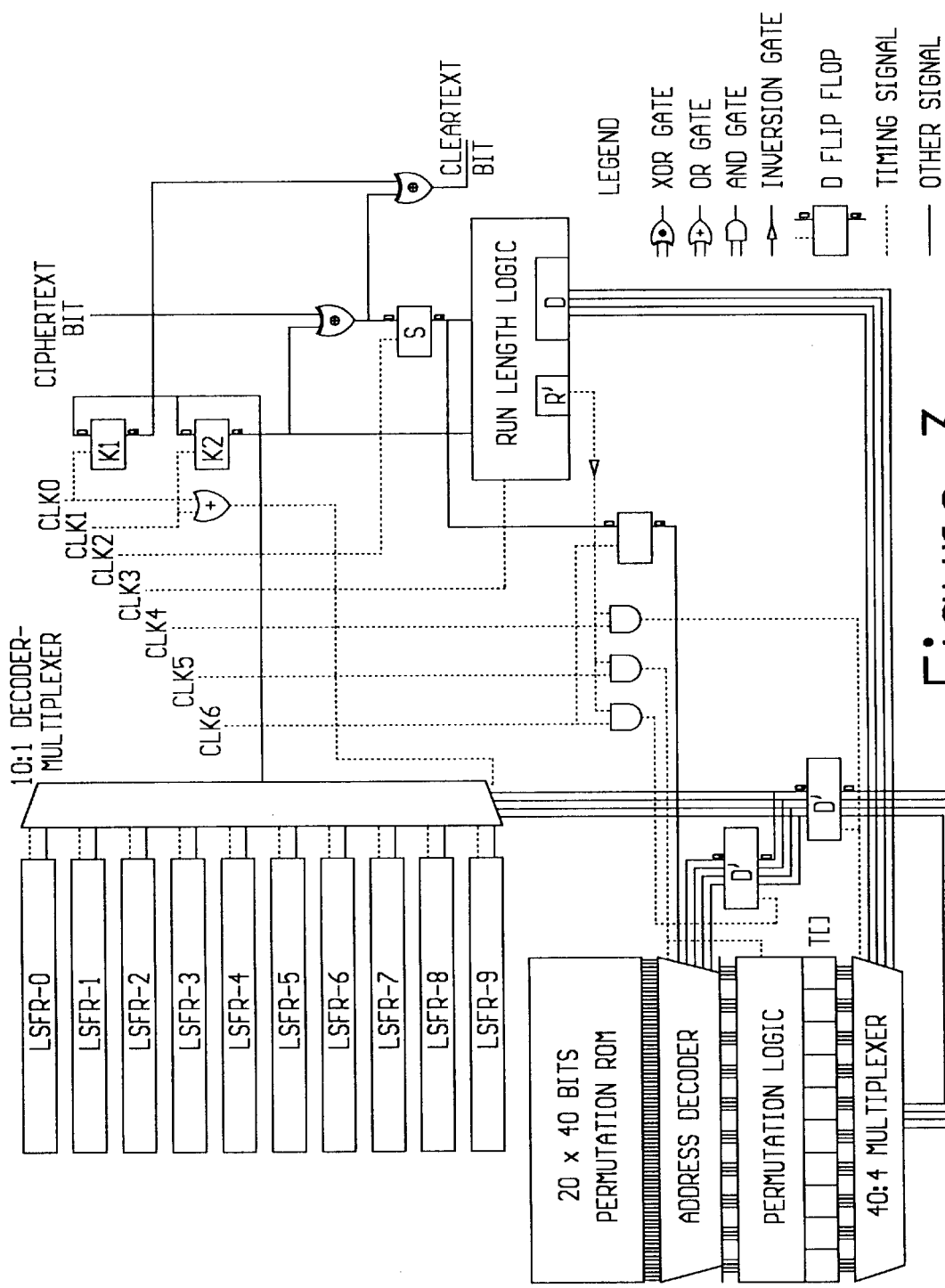
FIG. 3) is a block diagram illustrating a possible hardware implementation of the core Frogbit data integrity algorithm in its decryption mode.

The boolean logic behind the program listing "B" is partially listed in the table below. The program listing "C" illustrates the construction of the actual lookup table used in the program listing "B". The boolean logic can be applied to a hardware implementation of the core Frogbit algorithm shown in FIGS. 2 and 3, respectively for encryption and decryption. The table below specifies the details of the "run length logic" shown in FIGS. 2 and 3. If imprecise, this fourth formulation of the core Frogbit algorithm is subordinate to the mathematical formulation.

| Inputs | | | | | Outputs | | | | | |
|--------|--|--|--|--|---------|--|--|--|--|--|
| External | Internal memory | | | | Externally used | | | $d_0(i), k2_i$ | Internal memory | |
| $k2_i$ | $s_i$ | $k2_{i-1}$ | r'(i − 1) | $s_{i-1}$ | $d_3(i)$ | $d_2(i)$ | $d_1(i)$ | $k2_i$ | r'(i) | $s_i$ |
| 0 | 0 | 0/1 | 0 | 0 | ? | ? | ? | 0 | 1 | 0 |
| 0 | 0 | 0/1 | 0 | 1 | 0 | 0 | 0 | 0 | 0 | 0 |
| 0 | 0 | 0 | 1 | 0 | 0 | 1 | 1 | 0 | 0 | 0 |
| 0 | 0 | 0 | 1 | 1 | 0 | 0 | 1 | 0 | 0 | 0 |
| 0 | 0 | 1 | 1 | 0 | 1 | 0 | 0 | 0 | 0 | 0 |
| 0 | 0 | 1 | 1 | 1 | 0 | 1 | 0 | 0 | 0 | 0 |
| 0 | 1 | 0/1 | 0 | 0 | 0 | 0 | 0 | 0 | 0 | 1 |
| 0 | 1 | 0/1 | 0 | 1 | ? | ? | ? | 0 | 1 | 1 |
| 0 | 1 | 0 | 1 | 0 | 0 | 0 | 1 | 0 | 0 | 1 |
| 0 | 1 | 0 | 1 | 1 | 0 | 1 | 1 | 0 | 0 | 1 |
| 0 | 1 | 1 | 1 | 0 | 0 | 1 | 0 | 0 | 0 | 1 |
| 0 | 1 | 1 | 1 | 1 | 1 | 0 | 0 | 0 | 0 | 1 |
| 1 | 0 | 0/1 | 0 | 0 | ? | ? | ? | 1 | 1 | 0 |
| 1 | 0 | 0/1 | 0 | 1 | 0 | 0 | 0 | 1 | 0 | 0 |
| 1 | 0 | 0 | 1 | 0 | 0 | 1 | 1 | 1 | 0 | 0 |
| 1 | 0 | 0 | 1 | 1 | 0 | 0 | 1 | 1 | 0 | 0 |
| 1 | 0 | 1 | 1 | 0 | 1 | 0 | 0 | 1 | 0 | 0 |
| 1 | 0 | 1 | 1 | 1 | 0 | 1 | 0 | 1 | 0 | 0 |
| 1 | 1 | 0/1 | 0 | 0 | 0 | 0 | 0 | 1 | 0 | 1 |
| 1 | 1 | 0/1 | 0 | 1 | ? | ? | ? | 1 | 1 | 1 |
| 1 | 1 | 0 | 1 | 0 | 0 | 0 | 1 | 1 | 0 | 1 |
| 1 | 1 | 0 | 1 | 1 | 0 | 1 | 1 | 1 | 0 | 1 |
| 1 | 1 | 1 | 1 | 0 | 0 | 1 | 0 | 1 | 0 | 1 |
| 1 | 1 | 1 | 1 | 1 | 1 | 0 | 0 | 1 | 0 | 1 |

Four formulations were given for the core Frogbit algorithm, but the spirit of the present invention deserves a little more narrative specification. The goal of the Frogbit cipher is to make sure that inverting one bit in the ciphertext (by a defrauder) leads to inverting the corresponding bit of the cleartext (as recovered by the legitimate receiver) plus a permanent change in the rest of the key stream, (and thus the rest of the recovered message is randomized for the legitimate receiver). So the data integrity protection may be provided by the Frogbit cipher with some cleartext message redundancy which should allow the receiver party to detect any such message randomization with high probability. This redundancy may take the form of a simple "exclusive or" checksum of sufficient length appended to the message.

With the Frogbit cipher, each cleartext bit $m_i$ is doubly encrypted by two key stream bits, $k1_i$ and $k2_i$. The advantage of double encryption is not strengthened confidentiality. Instead, the double encryption creates a secret "inner sequence" bit $s_i$. It is significant that the secret inner sequence bit $s_i$ and the second secret key stream bit $k2_i$, are both (pseudo-)random and (pseudo-)independent of each other. Moreover, inversing one bit of the ciphertext changes both the cleartext recovered by the legitimate receiver (according to the encryption equation $e_i = k1_i$ XOR $m_i$ XOR $k2_i$) and the inner sequence (according to the equation for inner sequence $s_i$).

The permanent change in the rest of the key stream comes from the variations of subsequent key stream bits $k1_{i+1}$ and $k2_{i+1}$, key stream bits $k1_{i+2}$ and $k2_{i+2}$, and so on, by a decision machine having finite state information and two inputs, respectively the secret inner sequence bit $s_i$ and the second secret key stream bit $k2_i$. Suitable decision machines are such that it is hard to find a collision, that is two message substrings $m_i, m_{i+1}, \ldots, m_{i+k-1}$ and $m'_i, m'_{i+1}, \ldots, m'_{i+k-1}$ that start and end with the same state information in the decision machine. The core Frogbit algorithm is one such decision machine. There are three intermixed components in the core Frogbit algorithm: 1) the "run length process", 2) the "index permutation process", and 3) the "key source selection".

The term "run length encoding" refers to a coding or compression method based on counting consecutive repeated values in a message. For the Frogbit cipher, the run length encoding is applied to bits $s_i$ of the inner sequence. In the mathematical formulation of the core Frogbit algorithm, the run length is the function r(i). In practice, the run length must be bounded by a finite upper limit, the parameter n. In the mathematical formulation of the core Frogbit algorithm, the bounded run length is the function r'(i). In the mathematical formulation of the core Frogbit algorithm, each bounded run is marked with r'(i)=0, and is the occasion for to "draw" a number, that is the function d(i). The draw function uses the second half of the key stream ($k2_i$) to produce the number. The preferred embodiment uses the parameter n set to 2.

The Frogbit run length process is only the first part of a finite state machine characterized by its dual input $s_i$ and $k2_i$. The distinctive feature of the core Frogbit specification is that a change in $s_i$ will trigger, with a very high probability, an arbitrary modification to the following bit pairs <$k1_{i+1}$, $k2_{i+1}$>, <$k1_{i+2}$, $k2_{i+2}$>, and so on.

The index permutation process maintains a table of ten permuted indexes, that is the function T(i). When the run length process draws the number d(i), two things occur: a new index d'(i) is established as the pseudo-random sequence selector for the next bit positions, and the index table function T(i) is updated. The function i'(i) is merely a function that "points to" the beginning of a bounded run that finishes at bit position i.

The permutation table P is an important source of diffusion for the index permutation process. The reference permutation table in was selected by a "fair" pseudo-random program that enforced a number of criteria. It limited the frequency of a given number in any column of the table (a limit of three occurrences per column). It forced the permutation of each row to contain exactly two cycles (e.g. in the first row, positions. It didn't allow any cycle of length one. Additional 0, 2, 5, and 7 are permuted among themselves, as are every other care was taken to avoid cycles made of the same positions in two different rows.

The key source selection includes the flexible part of the core Frogbit specification. The Frogbit cipher may be implemented with ten completely unrelated pseudo-random generators, either with a single secret key and a seed derivation specification for each generator, or with ten secret seeds. This creates an opportunity for a multitude of different "proprietary ciphers" (ciphers of which design are kept secret by commercial organizations).

The ten independent pseudo-random sources need only to meet the generic requirements to have ten independent pseudo-random sequences securely derived from a secret key (without knowledge of the secret key, it is computationally infeasible to guess any portion of any sequence, or any correlation between any two sequences). The pseudo-random sequences are independently utilized by the Frogbit cipher, one bit at a time: the utilization (or absence of utilization) of one sequence must not change the state (e.g. current location within the sequence) of any other sequence. Then, for each bit i processed by the Frogbit cipher, the index permutation process provides an index d'(i−1) which selects the pseudo-random sequence to utilize for the pair of bits <$k1_i$, $k2_i$>.

The Frogbit cipher accommodates any pseudo-random generator which is acceptable as a stream cipher. Moreover, the Frogbit cipher algorithm might be secure even with bad generators, of which security would be questionable if used in a normal stream cipher arrangement. For instance, the "LFSF" (Linear Feedback Shift Register) is a type of pseudo-random number generator easily implemented in hardware.

There are many ways to practice the present invention. One is the creation of proprietary algorithms when reverse engineering is a threat. Another one is a secure hash function.

A simple initialization procedure for the Frogbit cipher is to set the seeds for the ten independent pseudo-random generators from the secret key. In fact, secret initialization can go beyond the ten pseudo-random seeds: every single element of the Frogbit state can be derived from a secret key. It is thus possible to use diverse conventions for the secret part of the initial state information.

The Frogbit cipher state comprises the following elements: for the run length processing, 1) the previous bit for the run length processing, that is $s_{i-1}$, 2) the current bounded run count, that is r'(i−1), 3) a partial sum, that is the accumulated binary representation $k2_{i-r'(i-1)}$, $k2_{i-r'(i-1)+1}$, ... $k2_{i-1}$ (actually, when n=2, this is at most a single bit of information); for the index permutation process, 4) the current permutation table, that is T(i−1−r'(i−1)); for the key source selection, 5) the current key stream number, that is d'(i−1), and finally 6) the state of the ten pseudo-random generators, or the ten key stream positions.

The number of states for item 6) of the Frogbit cipher state can be viewed as 10 times the count for each pseudo-random generator (for a purely periodic generator, the state count is the period of the generator). Even with the simplest pseudo-random generators, the total is a reasonable figure by current standards of secret key cryptography. Alternatively, for the state of the ten independent key streams, we may focus on the advance of each one. This information is relative to the start of message processing. Then, the state consists of the count of bit pairs extracted from each key stream. These two approaches are applicable respectively to the proprietary algorithms and the hash function.

The Frogbit cipher allows the use of a single secret key for multiple encryptions, with the following initialization procedure: as before, the secret key defines part of (or all) the initial Frogbit state, but this time, a fixed number of random bits are encrypted before the message encryption starts. The required number of bits may be in the range of 16 to 64. In the field of cryptography, this is known as salting (the deliberate and unilateral addition of meaningless random bits to a message). The random bits need not be shared with the legitimate receiver of the message. They are encrypted, their ciphertext is sent to the receiver as a message prefix. The receiver simply decrypts them and ignores them.

This scheme is a significant reduction of the key management overhead for stream ciphers. The unmodified stream cipher requires a unique shared secret key for every message. The Frogbit cipher initialized with message salting needs only a private random source in the sender's computing environment (the secret key is set like in the case of a block encryption algorithm). The requirement for message salting is independent from the design flexibility of secret state initialization: it occurs whenever a single secret key is used for more than one message, and attacks on the first few bits of the message are to be prevented.

It is thus possible to give an example of the use of the Frogbit data integrity algorithm for the creation of proprietary algorithms. Using the known art, ten unique pseudo-random generators are designed. Then, they are programmed in source code and merged with the source code for the core Frogbit algorithm. The computer subprogram for data concealment is programmed in source code with the steps of prefixing the cleartext data with random bits, appending some message redundancy, and feeding this expanded data stream to the encrypting part of the core Frogbit algorithm combined with the ten pseudo-random generators. The computer subprogram for data recovery is programmed in source code with the steps of feeding the ciphertext to the decrypting part of the core Frogbit algorithm combined with the ten pseudo-random generators, checking the message redundancy appendix, and discarding the random prefix. The resulting programs are compiled and linked with other software application modules and a definitive value is included as a secret key used for both data concealment and data recovery.

The following notation will be useful to disclose the use of the Frogbit algorithm for a hash function: let $e_i=F(m_i,G_i)$ and $G_{i+1}=F'(m_i,G_i)$ represent, respectively, the encryption F( ) of cleartext message bit $m_i$ (for $0<=i<n$ where n is the message length) into the ciphertext bit $e_i$ using the Frogbit state $G_i$, and the internal Frogbit state transformation F'( ) that occurs during this encryption step.

The CBC-MAC (Cipher Block Chaining-Message Authentication Code) method can be adapted to the Frogbit algorithm. This method requires the definition of a block size b. Then, the functions $e_i=F(m_i,G_i)$ and $G_{i+1}=F'(m_i,G_i)$ are replaced by $e_i=F(m_i \text{ XOR } e_{i-b},G_i)$ and $G_{i+1}=F'(m_i \text{ XOR } e_{i-b},G_i)$, respectively. The bits $e_{-b},e_{-b+1},\ldots,e_{-1}$ constitute an arbitrary b bit "initialization vector". Note that message padding to an exact block boundary is not required by the bit-oriented Frogbit cipher. But the last b bits of the message deserve some special attention to prevent attacks on the last bits of the message. This requires an extra block of encrypted data at the end of the ciphertext, as in $e_{n+i}=F(e_{n+i-b},G_{n+i})$ and $G_{n+i+1}=F'(e_{n+i-b},G_{n+i})$, for $0<=i<b$. With the CBC-MAC method applied to the Frogbit cipher, $e_n, e_{n+1}, \ldots, e_{n+b-1}$ represents the CBC-MAC value.

The initial Frogbit state $G_0$ is a public parameter of the secure hash function. The final state (notation $G_{n+b}$) is encoded in the hash result, with only minor loss of information. Then, $G_0$ and $G_{n+b}$ are the starting and ending points of a kind of random walk influenced by the message contents. It is hard to find a collision, that is two message substrings $m_i, m_{i+1}, \ldots, m_{i+k-1}$ and $m'_i, m'_{i+1}, \ldots, m'_{i+k-1}$ that start and end with the same pair of states $G_i$ and $G_{i+k}$. The CBC processing coerses the substring $e_i, e_{i+1}, \ldots, e_{i+k-1}$ and $e'_i, e'_{i+1}, \ldots, e'_{i+k-1}$.

Other public parameters are needed for the hash function, to describe the underlying pseudo-random sequences. In this context, the ten key streams turn into long, linearly independent, and constant binary strings; a pseudo-random generator is little more that a convenient specification tool (in theory, the complete sequences could be published). A distinctive characteristic of the Frogbit secure hash function is this stillness of the ten independent keystreams. This constant data is intrinsically part of the definition of the hash function. It should represent an important difficulty for cryptanalysis attempts at the Frogbit secure hash function.

The suggested hash algorithm comprises four sequences of Frogbit processing: i) the CBC processing of the complete message, ii) a CBC closing block processing, concluding with the relevant final state to be encoded, iii) the CBC processing of this encoded final state, and iv) another CBC closing block processing. The block size b applicable to the message CBC processing need not be equal to the block size b' applicable to the final state CBC processing. The first two sequences are represented with the notation introduced in the previous section for the CBC processing: $e_i=F(m_i \text{ XOR } e_{i-b}, G_i)$ and $G_{i+1}=F'(m_i \text{ XOR } e_{i-b}, G_i)$, for $0<=i<n$, $e_{n+i}=F(e_{n+i-b},G_{n+i})$ and $G_{n+i+1}=F'(e_{n+i-b}, G_{n+i})$, for $0<=i<b$, where the public initialization vector is $e_{-b},e_{-b+1},\ldots,e_{-1}$. Then, the final state is $G_{n+b}$; it is encoded using v bits, with the notation $g_0, g_1, \ldots, g_{v-1}$ (the dimension v is not a constant among different messages). The term encoding is to be understood as usual in the field of computer science. In this context, to encode a Frogbit state $G_i$, it is sufficient to focus on the relative positions of each key streams. The last two sequences are represented by: $e_{n+b+i}=F(g_i \text{ XOR } e_{n+b+i-b'}, G_{n+b+i})$ and $G_{n+b+i+1}=F'(g_i \text{ XOR } e_{n+b+i-b'}, G_{n+b+i})$ for $0<=i<v, e_{n+b+v+i}=F(e_{n+b+v+i-b'}, G_{n+b+v+i})$ and $G_{n+b+v+i+1}=F'(e_{n+b+v+i-b'}, G_{n+b+v+i})$ for $0<=i<b'$. The hash function result is $e_n,e_{n+1},\ldots,e_{n+b-1}, e_{n+b+v}, e_{n+b+v+1}, \ldots, e_{n+b+v+b'-1}$, which is the concatenation of two bit strings, the two closing blocks respectively from the message CBC processing and the final state CBC processing. Reasonable values for the block sizes may be cited as b=96 and b'=64.

It should be obvious to one of ordinary skill in the art that the core Frogbit algorithm can be used in many other ways to provide practical data integrity algorithms.

- 19 -

PROGRAM LISTING "A"

```
/*********************************************************************/
/***                                                               ***/
/***              The core Frogbit algorithm                       ***/
/***                                                               ***/
/*********************************************************************/
    typedef int index;
    typedef int bit;
    /*---------------------------------------------------------------*/
    /*--------------- the state of the Frogbit algorithm ------------*/
    index T[10];      /* the current permutation table, T(i-1-r'(i-1))  */
    index d_;         /* the current key stream number, d'(i-1)          */
    bit s;            /* the previous bit, s{i-1}                        */
    /* local variables for the run length process                        */
    index r_;         /* the current bounded run count, r'(i-1)          */
    index acc_d;      /* accumulated binary representation K2{i-1}, k2{i}*/
    /*---------------------------------------------------------------*/
    /*----------------- keystream "drift" accumulators --------------*/
        /* These accumulators are for information purposes. Their final
           values may come into play for a hash code. The active state of
           the pseudo-random generators is dealt with later.            */
    struct cntr
    {
       unsigned long c;  /* A count of consumed keystream bits ...    */
       int i;            /*                ... for this key stream source. */
    } drift_cnt[10];
    /*---------------------------------------------------------------*/
    /*----------------- the index permutation process --------------*/
    void index_permutation(int j)
    {
       int temp;
       int temp_d_= T[j];
       switch((d_<<1)+s)
       {
       case 0:
           temp=T[0]; T[0]=T[5]; T[5]=T[2]; T[2]=T[7]; T[7]=temp;
           temp=T[1]; T[1]=T[8]; T[8]=T[6]; T[6]=T[4]; T[4]=T[3]; T[3]=T[9];
                  T[9]=temp;
           break;
       case 1:
           temp=T[0]; T[0]=T[2]; T[2]=T[7]; T[7]=temp;
           temp=T[1]; T[1]=T[3]; T[3]=T[6]; T[6]=T[9]; T[9]=T[4]; T[4]=T[8];
                  T[8]=T[5]; T[5]=temp;
           break;
       case 2:
           temp=T[0]; T[0]=T[6]; T[6]=T[8]; T[8]=T[9]; T[9]=T[5]; T[5]=T[7];
                  T[7]=T[1]; T[1]=temp;
           temp=T[2]; T[2]=T[4]; T[4]=T[3]; T[3]=temp;
           break;
       case 3:
           temp=T[0]; T[0]=T[6]; T[6]=temp;
           temp=T[1]; T[1]=T[5]; T[5]=T[3]; T[3]=T[4]; T[4]=T[2]; T[2]=T[8];
                  T[8]=T[7]; T[7]=T[9]; T[9]=temp;
           break;
       case 4:
           temp=T[0]; T[0]=T[3]; T[3]=T[6]; T[6]=T[5]; T[5]=T[1]; T[1]=T[2];
                  T[2]=temp;
           temp=T[4]; T[4]=T[8]; T[8]=T[7]; T[7]=T[9]; T[9]=temp;
```

- 20 -

```
        break;
    case 5:
        temp=T[ 0]; T[ 0]=T[ 6]; T[ 6]=T[ 7]; T[ 7]=T[ 3]; T[ 3]=T[ 1]; T[ 1]=T[ 2];
                T[ 2]=T[ 9]; T[ 9]=temp;
        temp=T[ 4]; T[ 4]=T[ 5]; T[ 5]=T[ 8]; T[ 8]=temp;
        break;
    case 6:
        temp=T[ 0]; T[ 0]=T[ 4]; T[ 4]=T[ 3]; T[ 3]=T[ 7]; T[ 7]=T[ 6]; T[ 6]=T[ 1];
                T[ 1]=T[ 8]; T[ 8]=T[ 5]; T[ 5]=temp;
        temp=T[ 2]; T[ 2]=T[ 9]; T[ 9]=temp;
        break;
    case 7:
        temp=T[ 0]; T[ 0]=T[ 5]; T[ 5]=T[ 4]; T[ 4]=temp;
        temp=T[ 1]; T[ 1]=T[ 9]; T[ 9]=T[ 8]; T[ 8]=T[ 6]; T[ 6]=T[ 2]; T[ 2]=T[ 3];
                T[ 3]=T[ 7]; T[ 7]=temp;
        break;
    case 8:
        temp=T[ 0]; T[ 0]=T[ 8]; T[ 8]=T[ 9]; T[ 9]=T[ 5]; T[ 5]=T[ 3]; T[ 3]=T[ 2];
                T[ 2]=T[ 1]; T[ 1]=temp;
        temp=T[ 4]; T[ 4]=T[ 6]; T[ 6]=T[ 7]; T[ 7]=temp;
        break;
    case 9:
        temp=T[ 0]; T[ 0]=T[ 9]; T[ 9]=T[ 7]; T[ 7]=T[ 8]; T[ 8]=T[ 1]; T[ 1]=T[ 4];
                T[ 4]=T[ 2]; T[ 2]=T[ 6]; T[ 6]=temp;
        temp=T[ 3]; T[ 3]=T[ 5]; T[ 5]=temp;
        break;
    case 10:
        temp=T[ 0]; T[ 0]=T[ 7]; T[ 7]=T[ 2]; T[ 2]=T[ 4]; T[ 4]=T[ 1]; T[ 1]=T[ 6];
                T[ 6]=T[ 5]; T[ 5]=T[ 9]; T[ 9]=temp;
        temp=T[ 3]; T[ 3]=T[ 8]; T[ 8]=temp;
        break;
    case 11:
        temp=T[ 0]; T[ 0]=T[ 1]; T[ 1]=T[ 4]; T[ 4]=T[ 7]; T[ 7]=T[ 5]; T[ 5]=T[ 2];
                T[ 2]=T[ 8]; T[ 8]=T[ 3]; T[ 3]=temp;
        temp=T[ 6]; T[ 6]=T[ 9]; T[ 9]=temp;
        break;
    case 12:
        temp=T[ 0]; T[ 0]=T[ 7]; T[ 7]=T[ 6]; T[ 6]=T[ 3]; T[ 3]=temp;
        temp=T[ 1]; T[ 1]=T[ 4]; T[ 4]=T[ 9]; T[ 9]=T[ 2]; T[ 2]=T[ 5]; T[ 5]=T[ 8];
                T[ 8]=temp;
        break;
    case 13:
        temp=T[ 0]; T[ 0]=T[ 3]; T[ 3]=T[ 5]; T[ 5]=T[ 2]; T[ 2]=temp;
        temp=T[ 1]; T[ 1]=T[ 9]; T[ 9]=T[ 7]; T[ 7]=T[ 4]; T[ 4]=T[ 6]; T[ 6]=T[ 8];
                T[ 8]=temp;
        break;
    case 14:
        temp=T[ 0]; T[ 0]=T[ 8]; T[ 8]=T[ 4]; T[ 4]=T[ 2]; T[ 2]=T[ 1]; T[ 1]=T[ 9];
                T[ 9]=T[ 3]; T[ 3]=temp;
        temp=T[ 5]; T[ 5]=T[ 7]; T[ 7]=T[ 6]; T[ 6]=temp;
        break;
    case 15:
        temp=T[ 0]; T[ 0]=T[ 9]; T[ 9]=T[ 6]; T[ 6]=T[ 3]; T[ 3]=T[ 1]; T[ 1]=T[ 5];
                T[ 5]=temp;
        temp=T[ 2]; T[ 2]=T[ 4]; T[ 4]=T[ 7]; T[ 7]=T[ 8]; T[ 8]=temp;
        break;
    case 16:
        temp=T[ 0]; T[ 0]=T[ 7]; T[ 7]=T[ 2]; T[ 2]=T[ 6]; T[ 6]=T[ 1]; T[ 1]=T[ 3];
                T[ 3]=T[ 9]; T[ 9]=T[ 8]; T[ 8]=temp;
        temp=T[ 4]; T[ 4]=T[ 5]; T[ 5]=temp;
```

```
            break;
        case 17:
            temp=T[ 0]; T[ 0]=T[ 4]; T[ 4]=T[ 1]; T[ 1]=T[ 7]; T[ 7]=T[ 8]; T[ 8]=temp;
            temp=T[ 2]; T[ 2]=T[ 9]; T[ 9]=T[ 3]; T[ 3]=T[ 5]; T[ 5]=T[ 6]; T[ 6]=temp;
            break;
        case 18:
            temp=T[ 0]; T[ 0]=T[ 2]; T[ 2]=T[ 3]; T[ 3]=T[ 8]; T[ 8]=temp;
            temp=T[ 1]; T[ 1]=T[ 7]; T[ 7]=T[ 5]; T[ 5]=T[ 6]; T[ 6]=T[ 4]; T[ 4]=T[ 9];
                T[ 9]=temp;
            break;
        case 19:
            temp=T[ 0]; T[ 0]=T[ 1]; T[ 1]=T[ 6]; T[ 6]=T[ 7]; T[ 7]=T[ 3]; T[ 3]=T[ 4];
                T[ 4]=temp;
            temp=T[ 2]; T[ 2]=T[ 5]; T[ 5]=T[ 9]; T[ 9]=T[ 8]; T[ 8]=temp;
            break;
        }
        d_ = temp_d_;
    }
/*---------------------------------------------------------------*/
/*-------------------- the core Frogbit algorithm ---------------*/
bit get_PR_bit(index PR_gen_selector); /* Forward reference: key stream
                                          sources                    */
bit encipher_bit(bit m_i_)
{
    int base;
    bit k1_i_   = get_PR_bit(d_);
    bit k2_i_   = get_PR_bit(d_);
    bit s_i_    = m_i_^k1_i_;
    drift_cnt[ d_].c++;
    if (s!=s_i_)
        if (r_==0) base=0;
        else       base=(acc_d+1)<<1;
    else if (r_!=0) base=(acc_d+3)<<1;
        else
        {
            acc_d=k2_i_;
            r_=1;
            return s_i_^k2_i_;
        }
    index_permutation(base+k2_i_);
    r_ = 0;
    s=s_i_;
    return s_i_^k2_i_;
}
bit decipher_bit(bit e_i_)
{
    int base;
    bit k1_i_   = get_PR_bit(d_);
    bit k2_i_   = get_PR_bit(d_);
    bit s_i_    = e_i_^k2_i_;
    drift_cnt[ d_].c++;
    if (s!=s_i_)
        if (r_==0) base=0;
        else       base=(acc_d+1)<<1;
    else if (r_!=0) base=(acc_d+3)<<1;
        else
        {
            acc_d=k2_i_;
            r_=1;
            return s_i_^k1_i_;
```

- 22 -

```
            }
        index_permutation(base+k2_i_);
        r_ = 0;
        s=s_i_;
5       return s_i_^k1_i_;
    }
```

- 23 -

PROGRAM LISTING "B"

```
/************************************************************************/
/***                                                                  ***/
/***              The core Frogbit algorithm                          ***/
/***                                                                  ***/
/************************************************************************/
typedef int index;
typedef int bit;
/*--------------------------------------------------------------------*/
/*--------------- the state of the Frogbit algorithm ----------------*/
index T[ 10];      /* the current permutation table, T(i-1-r'(i-1))   */
index d_;          /* the current key stream number, d'(i-1)          */
/* local variables for the run length process                         */
int k2_r_s_;       /* accumulated binary representation K2{i-1}, k2{i}*/
                   /* the current bounded run count, r'(i-1)          */
                   /* the previous bit, s{i-1}                        */
/*--------------------------------------------------------------------*/
/*----------------- keystream "drift" accumulators ------------------*/
    /* These accumulators are for information purposes. Their final
       values may come into play for a hash code. The active state of
       the pseudo-random generators is dealt with later.              */
struct cntr
{
  unsigned long c;  /* A count of consumed keystream bits ...         */
  int i;            /*              ... for this key stream source.   */
} drift_cnt[ 10];
/*--------------------------------------------------------------------*/
/*------------------- the core Frogbit algorithm --------------------*/
bit get_PR_bit(index PR_gen_selector); /* Forward reference: key stream
                                          sources                    */
static const int rle_logic_table[ 128]=
{  4,  5,  0,  1, 48, 49, 16, 17,  4,  5,  0,  1, 64, 65, 32, 33
,130,131,134,135,146,147,178,179,130,131,134,135,162,163,194,195
,140,139,136,143,184,155,152,187,140,139,136,143,200,171,168,203
, 10, 13, 14,  9, 26, 57, 58, 25, 10, 13, 14,  9, 42, 73, 74, 41
,130,133,134,129,146,177,178,145,130,133,134,129,162,193,194,161
,  4,  3,  0,  7, 48, 19, 16, 51,  4,  3,  0,  7, 64, 35, 32, 67
, 10, 11, 14, 15, 26, 27, 58, 59, 10, 11, 14, 15, 42, 43, 74, 75
,140,141,136,137,184,185,152,153,140,141,136,137,200,201,168,169
};
/*
We use a table-lookup the control part of Frogbit encryption and
decryption.
+--------------------------------------------------------------+
|                          Inputs                              |
+--------------------+-----------------------------------------+
|                    |            Internal memory             |
+------+------+-----------+-------+-------+------+-------------+
| k1{i}| k2{i}| m{i}/e{i}| k2{i-1}| r'(i-1)| s{i-1}| Direction bit|
+------+------+-----------+-------+-------+------+-------------+
+----------------------------------------------------------------+
|                          Outputs                               |
+--------------------------------+-------------------------------+
|                                |       Internal memory         |
+--------------------------------+--------------+----------------+
|         Externally used        |              |   Constant     |
+------------+-------+--------+--------+-------+------+----------+
|            |       |        |       |d{0}(i)|      |           |
```

```
        |output bit| d{3}(i)| d{2}(i)| d{1}(i)|  k2{i}  | r'(i)| s{i}| Direction bit|
        +----------+--------+--------+--------+--------+------+-----+--------------+
        */
        bit process_bit(bit m_i_)
 5      {
          int t1;
          {
            bit k1_i_    = get_PR_bit(d_);
            bit k2_i_    = get_PR_bit(d_);
10          drift_cnt[d_].c++;
            t1=rle_logic_table[(k2_r_s_&15)|(k2_i_<<5)|(m_i_<<4)|(k1_i_<<6)];
          }
          {
            int temp;
15          if (0==(t1&4))
            {
              temp=(d_<<1)+(0!=(k2_r_s_&2));
              k2_r_s_=t1;
              d_=T[(k2_r_s_>>3)&15];
20            switch(temp)
              {
              case 0:
                temp=T[ 0]; T[ 0]=T[ 5]; T[ 5]=T[ 2]; T[ 2]=T[ 7]; T[ 7]=temp;
                temp=T[ 1]; T[ 1]=T[ 8]; T[ 8]=T[ 6]; T[ 6]=T[ 4]; T[ 4]=T[ 3]; T[ 3]=T[ 9];
25                          T[ 9]=temp;
                break;
              case 1:
                temp=T[ 0]; T[ 0]=T[ 2]; T[ 2]=T[ 7]; T[ 7]=temp;
                temp=T[ 1]; T[ 1]=T[ 3]; T[ 3]=T[ 6]; T[ 6]=T[ 9]; T[ 9]=T[ 4]; T[ 4]=T[ 8];
30                          T[ 8]=T[ 5]; T[ 5]=temp;
                break;
              case 2:
                temp=T[ 0]; T[ 0]=T[ 6]; T[ 6]=T[ 8]; T[ 8]=T[ 9]; T[ 9]=T[ 5]; T[ 5]=T[ 7];
                            T[ 7]=T[ 1]; T[ 1]=temp;
35              temp=T[ 2]; T[ 2]=T[ 4]; T[ 4]=T[ 3]; T[ 3]=temp;
                break;
              case 3:
                temp=T[ 0]; T[ 0]=T[ 6]; T[ 6]=temp;
                temp=T[ 1]; T[ 1]=T[ 5]; T[ 5]=T[ 3]; T[ 3]=T[ 4]; T[ 4]=T[ 2]; T[ 2]=T[ 8];
40                          T[ 8]=T[ 7]; T[ 7]=T[ 9]; T[ 9]=temp;
                break;
              case 4:
                temp=T[ 0]; T[ 0]=T[ 3]; T[ 3]=T[ 6]; T[ 6]=T[ 5]; T[ 5]=T[ 1]; T[ 1]=T[ 2];
                            T[ 2]=temp;
45              temp=T[ 4]; T[ 4]=T[ 8]; T[ 8]=T[ 7]; T[ 7]=T[ 9]; T[ 9]=temp;
                break;
              case 5:
                temp=T[ 0]; T[ 0]=T[ 6]; T[ 6]=T[ 7]; T[ 7]=T[ 3]; T[ 3]=T[ 1]; T[ 1]=T[ 2];
                            T[ 2]=T[ 9]; T[ 9]=temp;
50              temp=T[ 4]; T[ 4]=T[ 5]; T[ 5]=T[ 8]; T[ 8]=temp;
                break;
              case 6:
                temp=T[ 0]; T[ 0]=T[ 4]; T[ 4]=T[ 3]; T[ 3]=T[ 7]; T[ 7]=T[ 6]; T[ 6]=T[ 1];
                            T[ 1]=T[ 8]; T[ 8]=T[ 5]; T[ 5]=temp;
55              temp=T[ 2]; T[ 2]=T[ 9]; T[ 9]=temp;
                break;
              case 7:
                temp=T[ 0]; T[ 0]=T[ 5]; T[ 5]=T[ 4]; T[ 4]=temp;
                temp=T[ 1]; T[ 1]=T[ 9]; T[ 9]=T[ 8]; T[ 8]=T[ 6]; T[ 6]=T[ 2]; T[ 2]=T[ 3];
60                          T[ 3]=T[ 7]; T[ 7]=temp;
```

- 25 -

```
            break;
        case 8:
            temp=T[ 0]; T[ 0]=T[ 8]; T[ 8]=T[ 9]; T[ 9]=T[ 5]; T[ 5]=T[ 3]; T[ 3]=T[ 2];
                T[ 2]=T[ 1]; T[ 1]=temp;
            temp=T[ 4]; T[ 4]=T[ 6]; T[ 6]=T[ 7]; T[ 7]=temp;
            break;
        case 9:
            temp=T[ 0]; T[ 0]=T[ 9]; T[ 9]=T[ 7]; T[ 7]=T[ 8]; T[ 8]=T[ 1]; T[ 1]=T[ 4];
                T[ 4]=T[ 2]; T[ 2]=T[ 6]; T[ 6]=temp;
            temp=T[ 3]; T[ 3]=T[ 5]; T[ 5]=temp;
            break;
        case 10:
            temp=T[ 0]; T[ 0]=T[ 7]; T[ 7]=T[ 2]; T[ 2]=T[ 4]; T[ 4]=T[ 1]; T[ 1]=T[ 6];
                T[ 6]=T[ 5]; T[ 5]=T[ 9]; T[ 9]=temp;
            temp=T[ 3]; T[ 3]=T[ 8]; T[ 8]=temp;
            break;
        case 11:
            temp=T[ 0]; T[ 0]=T[ 1]; T[ 1]=T[ 4]; T[ 4]=T[ 7]; T[ 7]=T[ 5]; T[ 5]=T[ 2];
                T[ 2]=T[ 8]; T[ 8]=T[ 3]; T[ 3]=temp;
            temp=T[ 6]; T[ 6]=T[ 9]; T[ 9]=temp;
            break;
        case 12:
            temp=T[ 0]; T[ 0]=T[ 7]; T[ 7]=T[ 6]; T[ 6]=T[ 3]; T[ 3]=temp;
            temp=T[ 1]; T[ 1]=T[ 4]; T[ 4]=T[ 9]; T[ 9]=T[ 2]; T[ 2]=T[ 5]; T[ 5]=T[ 8];
                T[ 8]=temp;
            break;
        case 13:
            temp=T[ 0]; T[ 0]=T[ 3]; T[ 3]=T[ 5]; T[ 5]=T[ 2]; T[ 2]=temp;
            temp=T[ 1]; T[ 1]=T[ 9]; T[ 9]=T[ 7]; T[ 7]=T[ 4]; T[ 4]=T[ 6]; T[ 6]=T[ 8];
                T[ 8]=temp;
            break;
        case 14:
            temp=T[ 0]; T[ 0]=T[ 8]; T[ 8]=T[ 4]; T[ 4]=T[ 2]; T[ 2]=T[ 1]; T[ 1]=T[ 9];
                T[ 9]=T[ 3]; T[ 3]=temp;
            temp=T[ 5]; T[ 5]=T[ 7]; T[ 7]=T[ 6]; T[ 6]=temp;
            break;
        case 15:
            temp=T[ 0]; T[ 0]=T[ 9]; T[ 9]=T[ 6]; T[ 6]=T[ 3]; T[ 3]=T[ 1]; T[ 1]=T[ 5];
                T[ 5]=temp;
            temp=T[ 2]; T[ 2]=T[ 4]; T[ 4]=T[ 7]; T[ 7]=T[ 8]; T[ 8]=temp;
            break;
        case 16:
            temp=T[ 0]; T[ 0]=T[ 7]; T[ 7]=T[ 2]; T[ 2]=T[ 6]; T[ 6]=T[ 1]; T[ 1]=T[ 3];
                T[ 3]=T[ 9]; T[ 9]=T[ 8]; T[ 8]=temp;
            temp=T[ 4]; T[ 4]=T[ 5]; T[ 5]=temp;
            break;
        case 17:
            temp=T[ 0]; T[ 0]=T[ 4]; T[ 4]=T[ 1]; T[ 1]=T[ 7]; T[ 7]=T[ 8]; T[ 8]=temp;
            temp=T[ 2]; T[ 2]=T[ 9]; T[ 9]=T[ 3]; T[ 3]=T[ 5]; T[ 5]=T[ 6]; T[ 6]=temp;
            break;
        case 18:
            temp=T[ 0]; T[ 0]=T[ 2]; T[ 2]=T[ 3]; T[ 3]=T[ 8]; T[ 8]=temp;
            temp=T[ 1]; T[ 1]=T[ 7]; T[ 7]=T[ 5]; T[ 5]=T[ 6]; T[ 6]=T[ 4]; T[ 4]=T[ 9];
                T[ 9]=temp;
            break;
        case 19:
            temp=T[ 0]; T[ 0]=T[ 1]; T[ 1]=T[ 6]; T[ 6]=T[ 7]; T[ 7]=T[ 3]; T[ 3]=T[ 4];
                T[ 4]=temp;
            temp=T[ 2]; T[ 2]=T[ 5]; T[ 5]=T[ 9]; T[ 9]=T[ 8]; T[ 8]=temp;
            break;
```

- 26 -

```
        }
        return 0! =(k2_r_s_&128);
      }
      k2_r_s_=t1;
5     return 0! =(k2_r_s_&128);
    }
  }
  void set_direction(bit decrypt_flag)
  {
10    k2_r_s_=(k2_r_s_&~1)|(decrypt_flag! =0);
  }
```

PROGRAM LISTING "C"

```
/*********************************************************************/
/***                                                               ***/
/***         Initialization for the Frogbit lookup table           ***/
/***                                                               ***/
/*********************************************************************/
#include <stdio.h>
#include <stdlib.h>
int main(int argc, char *argv)
{
  int inputs;
  printf(" static const int rle_logic_table[128]=\n {");
  for (inputs=0;inputs<128;inputs++)
  {
    int k1_i, k2_i, v_i, k2_i__1, r_i__1, s_i__1, dir;
    int outputs;
    /*
    +--------------------------------------------------------+
    |                         Inputs                         |
    +-------------------------+------------------------------+
    |                         |       Internal memory        |
    +-----+-----+---------+--------+--------+------+---------+
    |k1{i}|k2{i}|m{i}/e{i}|k2(i-1)| r'(i-1)|s{i-1}|Direction bit|
    +-----+-----+---------+--------+--------+------+---------+
    */
    k1_i    =(inputs&64)!=0;
    k2_i    =(inputs&32)!=0;
    v_i     =(inputs&16)!=0;
    k2_i__1 =(inputs&8)!=0;
    r_i__1  =(inputs&4)!=0;
    s_i__1  =(inputs&2)!=0;
    dir     =(inputs&1)!=0;
    /*
    +----------------------------------------------------------------+
    |                            Outputs                             |
    +-------------------------------+--------------------------------+
    |                               |       Internal memory          |
    +-------------------------------+---------------+----+-----------+
    |          Externally used      |               |    | Constant  |
    +----------+------+------+------+------+-----+----+------------+
    |          |      |      |      |d{0}(i)|      |    |            |
    |Output bit|d{3}(i)|d{2}(i)|d{1}(i)|      |k2{i}|r'(i)|s{i}|Direction bit|
    +----------+------+------+------+------+-----+----+------------+
    */
    outputs=dir;
    {
      /* do the Frogbit processing with these inputs */
      int s_i;
      if (dir)
        s_i=v_i^k2_i;
      else
        s_i=v_i^k1_i;
      outputs|=((k2_i^v_i^k1_i)<<7)|(s_i<<1);
      if (s_i__1!=s_i)
        if (r_i__1==0) outputs|=          k2_i <<3;
        else           outputs|= (2+(k2_i__1<<1)+k2_i)<<3;
      else
        if (r_i__1!=0) outputs|= (6+(k2_i__1<<1)+k2_i)<<3;
```

- 28 -

```
            else        outputs|=(              k2_i <<3)|(1<<2);
       }
      printf(" %3d%s",outputs
                  ,((inputs+1)%16)?",":((inputs==127)?"\n };":"\n ,"));
 5    }
      return EXIT_SUCCESS;
    }
    /* Sample output from this program:
    static const int rle_logic_table[128]=
10  {   4,  5,  0,  1, 48, 49, 16, 17,  4,  5,  0,  1, 64, 65, 32, 33
    ,130,131,134,135,146,147,178,179,130,131,134,135,162,163,194,195
    ,140,139,136,143,184,155,152,187,140,139,136,143,200,171,168,203
    ,  10, 13, 14,  9, 26, 57, 58, 25, 10, 13, 14,  9, 42, 73, 74, 41
    ,130,133,134,129,146,177,178,145,130,133,134,129,162,193,194,161
15  ,   4,  3,  0,  7, 48, 19, 16, 51,  4,  3,  0,  7, 64, 35, 32, 67
    ,  10, 11, 14, 15, 26, 27, 58, 59, 10, 11, 14, 15, 42, 43, 74, 75
    ,140,141,136,137,184,185,152,153,140,141,136,137,200,201,168,169
    };
    */
```

What is claimed is:

1. A cryptographic data integrity binary representation generator system for use with a second processor acting on said binary representation, or a transformation thereof, to produce a signal indicating, with an overwhelming probability whether said binary representation was generated according to said generator system, said generator system comprising:

means for consecutively transforming a cleartext message bit $m_i$ into a bit $e_i$ using bits $k1_i$ and $k2_i$ from keys $k1$ and $k2$ according to the following equation:

$$e_i = k1_i \text{ XOR } m_i \text{ XOR } k2_i;$$

and means for generating successive bits $k1_{i+1}$ and $k2_{i+1}$ from a decision machine having finite state information using ($k1_i$ XOR $m_i$) and $k2_i$ as inputs, said keys $k1$ and $k2$ having initial state information defining said bits $k1_i$ and $k2_i$, wherein said binary representation consists of a string of consecutive bits $e_i$, $e_{i+1}$, $e_{i+2}$, etc.

2. The binary representation system as claimed in claim 1, wherein said decision machine comprises a plurality of pseudo-random generators each having its own state information, said inputs of said decision machine influencing which one of said plurality of pseudo-random generators is used to obtain said bits $k1_{i+1}$ and $k2_{i+1}$.

3. The binary representation system as claimed in claim 2, wherein the said plurality of pseudo-random generators has ten pseudo-random generators.

4. The binary representation generator system as claimed in 2, wherein said plurality of pseudo-random generators make use of different algorithms.

5. The binary representation generator system as claimed in 3, wherein said plurality of pseudo-random generators make use of different algorithms.

6. The binary representation generator system as claimed in claim 1, wherein a string of said clear text message bits mi represent a cryptographic key.

* * * * *